United States Patent
Derrenberger

(10) Patent No.: US 8,234,217 B2
(45) Date of Patent: Jul. 31, 2012

(54) METHOD AND SYSTEM FOR SELECTIVELY PROVIDING ACCESS TO CONTENT

(75) Inventor: Mike Arthur Derrenberger, Fishers, IN (US)

(73) Assignee: Thomson Licensing, Boulogne Billancourt (FR)

(*) Notice: Subject to any disclaimer, the term of this patent is extended or adjusted under 35 U.S.C. 154(b) by 435 days.

(21) Appl. No.: 10/592,339

(22) PCT Filed: Mar. 17, 2005

(86) PCT No.: PCT/US2005/009055
§ 371 (c)(1),
(2), (4) Date: Sep. 11, 2006

(87) PCT Pub. No.: WO2005/104000
PCT Pub. Date: Nov. 3, 2005

(65) Prior Publication Data
US 2007/0198414 A1    Aug. 23, 2007

(51) Int. Cl.
*G06F 21/00* (2006.01)
(52) U.S. Cl. ............ 705/51; 725/31; 725/25; 725/153; 725/34; 713/193; 713/155; 713/164; 705/52; 705/57; 380/43; 380/228; 380/231; 380/281; 380/266; 386/231; 726/26; 726/25; 726/30
(58) Field of Classification Search ............... 713/193
See application file for complete search history.

(56) References Cited

U.S. PATENT DOCUMENTS

| | | | |
|---|---|---|---|
| 5,784,609 A | 7/1998 | Kurihara | |
| 7,099,479 B1 * | 8/2006 | Ishibashi et al. | 380/281 |
| 7,519,811 B1 | 4/2009 | Hara | |
| 2002/0174239 A1 | 11/2002 | Oue | |
| 2004/0093523 A1 * | 5/2004 | Matsuzaki et al. | 713/201 |

FOREIGN PATENT DOCUMENTS

| | | |
|---|---|---|
| GB | 2 367 925 A | 4/2002 |
| JP | 8-23315 | 1/1996 |
| JP | 8-190345 | 7/1996 |
| JP | 11-331310 | 11/1999 |

(Continued)

OTHER PUBLICATIONS

Jian Zhang et al. "A flexible content protection system for media-on-demand" Multimedia Software Engineering, 2002. proceedings. fourth international symposium on Dec. 11-13, 2002 Picataway, NJ, USA, IEEE, Dec. 11, 2002, pp. 272-277, XP010632760 ISBN: 0-7695-1857-5 the whole document.

(Continued)

*Primary Examiner* — Nathan Flynn
*Assistant Examiner* — Bryan Wright
(74) *Attorney, Agent, or Firm* — Robert D. Shedd; Paul P. Kiel

(57) ABSTRACT

A method of operating a digital program playback device, including: receiving, via a first communications network, a data stream including an encrypted data portion representative of a program; identifying, from the received data stream, an identifier associated with the program; transmitting the program identifier and a device identifier associated with the digital program playback device to an authorization device via a second communications network; receiving, via the second communications network, a decryption key in response to the transmission; and, decrypting the data stream using the decryption key and generating an output signal for playback of the program.

24 Claims, 5 Drawing Sheets

FOREIGN PATENT DOCUMENTS

| | | |
|---|---|---|
| JP | 2001-103047 | 4/2001 |
| JP | 2002-344440 | 11/2002 |
| WO | WO 02/13032 A1 | 2/2002 |
| WO | WO 02/065750 A2 | 8/2002 |
| WO | WO 03/088673 A1 | 10/2003 |

OTHER PUBLICATIONS

Rosenblatt B et al.: "Digital Rights Management, Passage" Digital Rights Management: Business and Technology, New York, NY: M&T Books, US2002, pp. 79-88, 95, XP002341140 ISBN: 0-7645-4889-1 the whole document.

Van Moffaert A et al: "Digital Rights Management: DRM is a key enabler for the future growth of the broadband access market, and the telecom/networking market in general" Alcatel Telecommunications Review, Alcatel, Paris Cedex, FR. Apr. 2003. XP0070005930 ISSN: 1267-7167 the whole document.

Thomson Multimedia: "SmartRight Contribution to Rights Management & Protection Specifications" Thomson Multimedia, May 22, 2002, XP002341140 ISBN: 0-7645-4889-1 the whole document.

Search Report dated Sep. 27, 2005.

* cited by examiner

METHOD AND SYSTEM FOR SELECTIVELY PROVIDING ACCESS TO CONTENT

This application claims the benefit, under 35 U.S.C. §365 of International Application PCT/US2005/009055, filed Mar. 17, 2005, which was republished in accordance with PCT Article 21(2) on Jan. 5, 2006 in English.

FIELD OF THE INVENTION

The present invention relates to methods and systems for restricting access to content, such as computer programs, audio programs and audio/visual programs.

BACKGROUND OF THE INVENTION

Widespread distribution of content, such as computer programs, audio programs and audio/visual programs, such as via transmission and/or prerecorded media (like CDs and DVDs), is common place. Preventing unauthorized access to distributed high value content has proven problematic however, particularly in the case of air broadcasts and pre-recorded media. Current methods use a variety of techniques of access protection including the use of Smart Cards, keys embedded with the content that can be decrypted using common keys, and keys that must be typed to unlock a computer program, for example.

Digital Rights Management is typically not integrated with copy protection systems to provide a comprehensive solution. For example, while copy protection schemes may exist for closed systems (e.g., satellite providers) these systems do not effectively integrate Digital Rights Management. Further, Digital Rights Management systems do not effectively exist for computer programs, and no effective solution has been developed for mobile devices. Further still, means of providing specific keys for specific content do not effectively exist. Finally, many systems have no means of reliably ensuring access to a bidirectional or two-way communications network to manage the copy protection process and associated digital rights. Improved mechanisms and techniques for overcoming the aforementioned problems are highly desired.

SUMMARY OF THE INVENTION

A method of operating a digital program playback device, including: receiving, via a first communications network, a data stream including an encrypted data portion representative of a program; identifying, from the received data stream, an identifier associated with the program; transmitting the program identifier and a device identifier associated with the digital program playback device to an authorization device via a second communications network; receiving, via the second communications network, a decryption key in response to the transmission; and, decrypting the data stream using the decryption key and generating an output signal for playback of the program.

BRIEF DESCRIPTION OF THE DRAWINGS

Understanding of the present invention will be facilitated by considering the following detailed description of the preferred embodiments of the present invention taken in conjunction with the accompanying drawings, in which like numerals refer to like parts, and.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical copy protection and digital rights management systems and methods. Those of ordinary skill in the art may recognize that other elements and/or steps are desirable and/or required in implementing the present invention. However, because such elements and steps are well known in the art, and because they do not facilitate a better understanding of the present invention, a detailed discussion of such elements and steps is not provided herein.

According to an aspect of the present invention, a centralized mechanism to use a communication network, such as a two-way paging network, as a means to access decryption keys to play-back encrypted content distributed using a variety of delivery methods may be provided. The system may enforce Digital Rights Management (DRM) and Copy Protection (CP) schemes and provide for wireless access to support fixed location and mobile devices (such as desktop personal computers and laptop personal computers, and fixed and mobile set-top boxes and display devices, for example). Further, the utilized network may provide for "always-on" functionality.

According to an aspect of the present invention, a system may typically incorporate content and key servers, hardware implementation of a security module in client devices, and a method to handle inherent latencies in the communication network used, to provide for low cost decryption key provision to facilitate copy protection and/or digital rights management schemes. According to an aspect of the present invention, such a system and method may actually encourage content copying, as there is no advantage to a "pirate" to copy content containing media that is encrypted but that itself lacks the necessary decryption keys.

Figure 1:
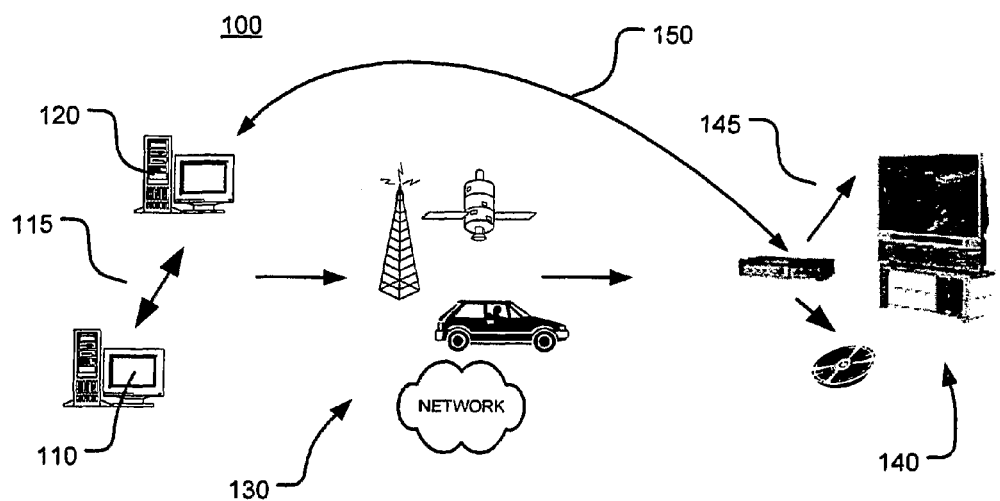
FIG. 1 illustrates a block diagrammatic view of a system according to an aspect of the present invention.

Referring now to FIG. 1, there is shown a system 100 according to an aspect of the present invention. System 100 generally includes content server(s) 110, key server(s) 120, content distribution measures 130 (such as wireless and/or wired transmission systems, like terrestrial and satellite television networks, the global interconnection of computers and computer networks commonly referred to as the Internet and cable television and computer networks; and media distribution channels, like retail distribution chains), client device(s) 140, and communications network 150.

Content (e.g., computer software, audio and/or video programs) is generally created, digitized if necessary, and stored on content server(s) 110. In an exemplary configuration, meta-data regarding the content is associated with the content to uniquely identify it. Key server(s) 120 include database(s) that include content encryption/decryption keys, the unique content identifiers, information as to what devices 140 are authorized devices, what devices are playing or recording, or have authority to play or record content, and how many times each device 140 has played or recorded the specific content, by way of non-limiting example. Content may be executed, played and/or recorded using device(s) 140, provided content server 110 permits it. Access to encrypted content occurs after a client playback device 140 securely obtains a corresponding decryption key from key server(s) 120. Permissions may be communicated via network 150, for example.

In an exemplary embodiment, content may be provided via content distribution measures 130, e.g., via broadcast or media distribution network(s). In order to record the content, a permission seeking device 140 may securely contact key server 120 via network 150 to determine if that device may copy the subject content. The subject content may be identified through companion meta-data, broadcast channel/time information, or the content itself, for example. Key server 120 may contact content server 110 over communication link 115 to determine Digital Rights Management (DRM) information associated with the subject content, e.g., whether the requesting device 140 is authorized to play and/or record the subject content. If permissible, key server 120 may securely return a unique content identifier and a recording key via network 150 to the requesting device 140. The requesting device. may then record the subject content using the information returned by key server 120, e.g., decrypting and/or encrypting keys. The recorded content may be encrypted for storage using such an encrypting key. The storage key may be different from that used to store the content on content server 110, and/or that protects the content prior to authorization from key server 120 to access the same. Alternatively, the content may be stored in the encrypted form it is received in, and the decryption key securely stored for later use.

By way of non-limiting example only, network 150 may take the form of a wireless communication network, like a two-way pager network. Communications via network 150, e.g., a pager network, may be encrypted (e.g., between device 140 (FIG. 1) and key server 120 (FIG. 1). While not critical, a two-way pager network may be particularly advantageous for use as at least part of network 150 due to cost considerations. It is expected that such a network will provide for relatively low costs per transaction, while providing broad accessibility across wide geographic regions. However, such a network may introduce inherent latencies in communications between device(s) 140 and key server 120. For example, latencies on the order of 1, 5 or even 10 minutes may be experienced. However, a two-way pager network solves the connection problem for fixed location client devices, such that telephone modems and other broadband connections are not needed. Additionally, the same system can be-used to provide connectivity for mobile client devices. Communications over network 150 may be secured to frustrate unauthorized access thereto, such as by encrypting them using a network 150 security key, or key pair.

Figure 2:
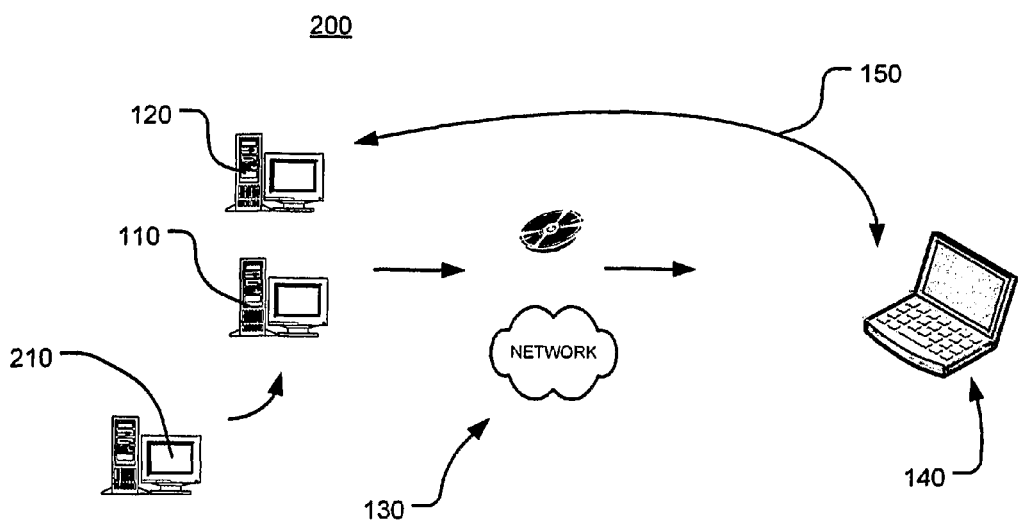
FIG. 2 illustrates a block diagrammatic view of a system according to an aspect of the present invention, and being well suited for use with computer software content.

Referring now also to FIG. 2, there is shown a system 200 according to an aspect of the present invention and being well suited for use with computer software content. Like references identify like elements in FIGS. 1 and 2. System 200 further includes program creation system 210, which may typically include multiple elements of hardware/software used to author computer executable code. Computer software content may be created using system 210. The content may then be provided to content server 110, where it may be encrypted and stored. Corresponding encryption/decryption key(s) and a content identifier may be provided to key server 120. A symmetrical key, or public/private key pair may be used. The program identifier may be in the clear, i.e., not encrypted. The encrypted content may be distributed using content distribution measures 130, such as via CD, DVD or a broadband network, for example. Computer program execution may occur at personal computer 140, upon obtaining a corresponding decryption key from key server 120 via network 150.

By way of further non-limiting example, key server 120 may create a corresponding entry in one or more database(s) that reflects the program encryption/decryption key(s), the unique program identifier, information regarding what devices are authorized devices, what devices are executing the content, and how many times the device has executed or been authorized to execute the specific content. The present invention contemplates various possible implementations. In a simplified embodiment, a device may re-query a key server for each installation, execution or playback. Alternatively, perpetual or time-based digital rights management information can be provided in a secure processor. In such a case, the key may be valid for one or for multiple installations, executions or playbacks, until key expiration, time-out, or a predetermined number of allowed plays has occurred.

Encrypted programs may be offered to be freely copied, as they do not contain activation keys. The encrypted content can be distributed using any type of content distribution measure (e.g., shipped as DVDs, Internet file, etc.). Computer execution of the encrypted program can only occur after decryption of the same, which requires a personal computer device 140 obtain the decryption key from key server 120 via network 150.

Figure 3:
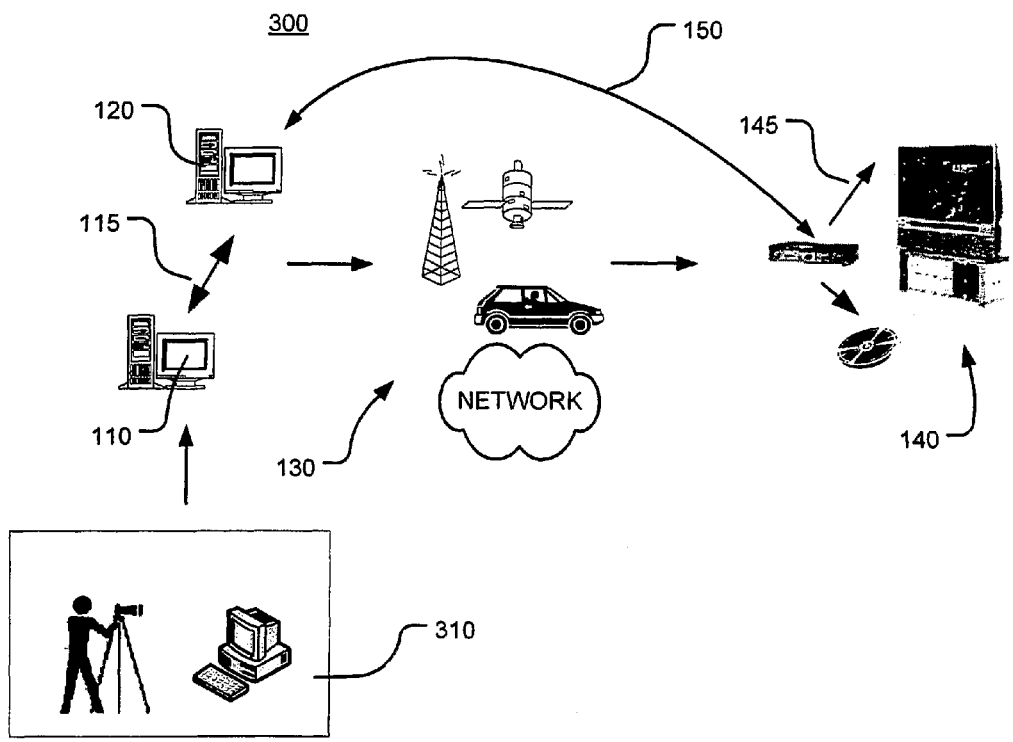
FIG. 3 illustrates a block diagrammatic view of a system according to an aspect of the present invention, and being well suited for use with audio/visual content.

Referring now also to FIG. 3, there is shown a system 300 according to an aspect of the present invention, and being well suited for use with audio/visual content. Like references again identify like elements in FIGS. 1 and 3. System 300 further includes content creation system 310, which may typically include cameras, microphones and hardware/software commonly used to record audio/visual presentations, like recordings, movies and television shows. Audio/visual content may be created and digitized using system 310. The content may again be provided to content server 110, where it may be encrypted and stored. A unique content identifier may be associated with the encrypted content as meta-data, and be provided in the clear. Corresponding. encryption/decryption keys and the content identifier may be provided to, and stored by key server(s) 120. The encrypted content may be distributed using content distribution measures 130, such as via CD, DVD or a broadcast network, for example. Playback may occur at playback device 140, such as a device akin to a digital receiver or DVD player, upon obtaining a corresponding decryption key from key server 120 via network 150.

By way of further non-limiting example, key server 120 may create a corresponding entry in one or more database(s) that reflects the program encryption/decryption key(s), the unique program identifier, information regarding what devices are authorized devices, what devices are authorized to play and/or record the content, and how many times a device has accessed or been authorized to access specific content. Encrypted programs may be offered to be freely copied, as they do not contain activation keys. The encrypted content can be distributed using any type of content distribution measure (e.g., broadcast transmission, shipped as DVDs, Internet files, etc.). Copying or playback of the encrypted program can only occur after decryption of the same, which requires a player device 140 obtain the decryption key from key server 120 via network 150.

Figure 4:
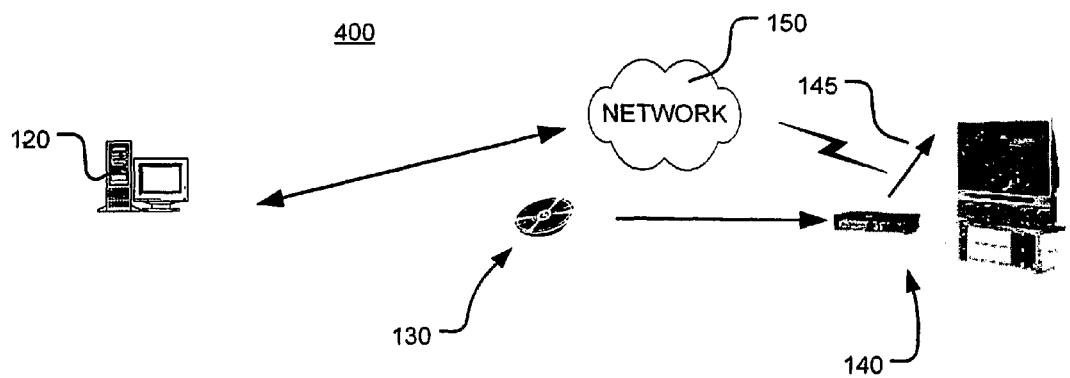
FIG. 4 illustrates a block diagrammatic view of an exemplary playback process being suitable for use with the system of FIG. 3.

Referring now also to FIG. 4, there is shown a block diagrammatic view of an exemplary playback process 400 being suitable for use with system 300 of FIG. 3. A playback device 140 determines the content identifier associated with the content to be played, such as by reading it from a media, such as a DVD or CD, that contains the clear-text identifier and encrypted content. Playback device 140 may then contact key server 120 via network 150, which may take the form of a two-way pager network, for example. Key server 120 authenticates player device 140 and the unique program identifier. If playback is permitted, e.g., if the content still has play rights, key server 120 sends a corresponding decryption key (that may be a symmetrical key or a corresponding part of a key pair, both by way of non-limiting example) to playback device 140 using network 150 in a secure manner. Playback device 140 may use the acquired key to decrypt the content for playback and generate an output signal 145 for playback of the decrypted program content on a display device, such as via a display device communicatively coupled to the playback device (such as via RCA cables or an HDMI interface, for example).

Figure 5A:
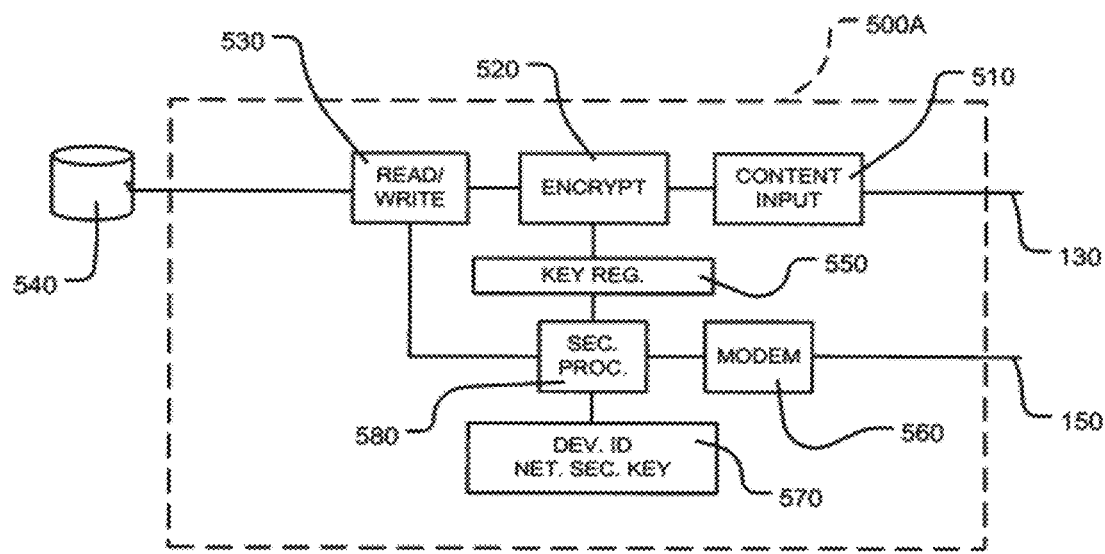
FIGS. 5A and 5B illustrate block diagrammatic views of architectures that may be utilized in a client device according to an aspect of the present invention.

Referring now also to FIG. 5A, there is shown a block diagrammatic view of an architecture 500A that may be utilized in a client device, such as device 140 of FIGS. 1-4, according to an aspect of the present invention. Architecture 500A may serve to implement the overall security policy associated with content recording for a client device 140, and may even be integrated into the device's audio/video decoder, for example.

By way of non-limiting example, architecture 500A may include an input 510 suitable for receiving encrypted content from content distribution measures 130 (FIG. 1). Input 510 may take the form of an audio/visual data decoder or buffer for receiving a data stream from an antenna or network connection, or media drive, for example. Received data may be stored in a storage device 540, such as a hard-drive, and read there-from using a read/write interface 530. Received data may be provided to an encryptor/decryptor 520. A content key register 550 may store keys and corresponding content identifiers for use by encryptor/decryptor 520. Architecture 500A may further include a modem 560 for communicating via network 150, and a device identifier and network 150 security key store 570. Store 570 may store a device identifier of a particular device 140 and a network security key for network 150. Architecture 500A may operate responsively to a security processor 580. A/V or content data may be provided from any suitable source serving as medium 130 (such as a satellite tuner/demodulator, home network, or cable/demodulator). Network 150 communications (e.g., wireless pager transmissions) are received by modem 560 (such as a pager network modem).

Generally, according to an aspect of the present invention, it is undesirable to store A/V content in the clear on device 540. Accordingly, it is generally desirable to encrypt the A/V content before it is stored. A corresponding encryption key and Unique Content ID may be provided by key server 120 and sent via network 150 using modem 560. This encryption key may be used by encryptor/decryptor 520 to encrypt the content before placing it in storage device 540.

Figure 5B:
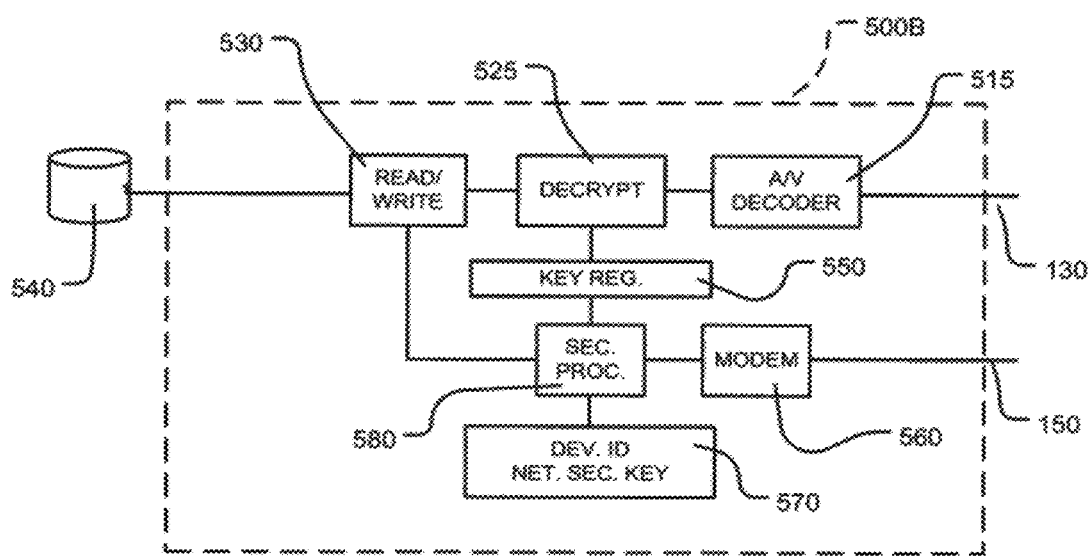

Referring now also to FIG. 5B, there is shown a block diagrammatic view of an architecture 500B that may be utilized in a client device, such as device 140 of FIGS. 1-4, according to an aspect of the present invention. Like references identify like elements in FIGS. 5A and 5B. According to an aspect of the present invention, architecture 500B may serve to implement the overall security policy associated with content playback for a client device 140, and may even be integrated into the device's audio/video decoder, for example. Architecture 500B additionally includes an ANV decoder 515 and an encryptor/decryptor 525, that optionally may be the same encryptor/decryptor element 520. Again, security processor 580 controls authentication and key handling. Public/private key pair encryption techniques may be used. After a device 140 and particular content has been authenticated, responsively to device and content identifiers being sent to key server 120, security processor 580 receives the encrypted content key from key server 120 (via, network 150 and modem 560). The content decryption key may then be written into registry 550, which is not generally accessible except by security processor 580, and used to decrypt the associated content using encryptor/decryptor 525 for content decoding using decoder 515. The content may be recovered from store 540 and decrypted, for example.

Figure 6:
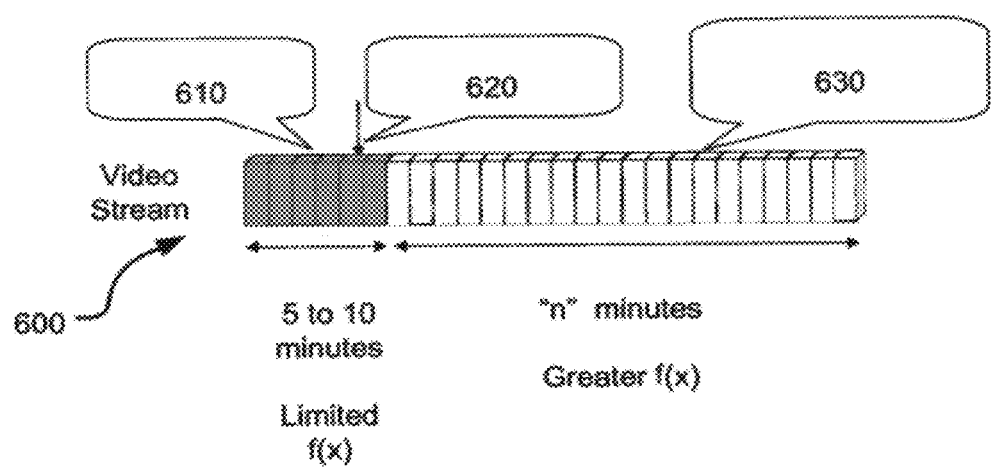
FIG. 6 illustrates a graphical representation of a mechanism to account for latencies in network transmissions according to an aspect of the present invention; and, FIG. 7 illustrates a method according to an aspect of the present invention.

Referring now also to FIG. 6, there is shown a graphical representation of a mechanism to account for latencies in transmissions via network 150 according to an aspect of the present invention. As set forth, network 150 may introduce latency into communications between device(s) 140 and key server(s) 120. Too much latency in the system and the user may not find the system usable. In order to hide the transmission latency, a first portion of the program data stream, such as the first few minutes (e.g. 5-10minutes) of an audio/visual program, may be permitted to be accessed (e.g., executed, played and/or recorded) before the content has been identified by key server 120 and/or content server 110, and the result returned to a device 140. Such execution may correspond to limited functionality of a computer program product. Such playing or recording can be used to implement the pause feature associated with a digital video recorder (DVR) (and therefore set a limit on how long content can be paused without having rights to record the content). The recording of program content during this interval can be stored in the clear or encrypted using a common encryption key that may be stored in multiple devices 140.

By way of further, non-limiting example, a first portion 610 of program content 600 may be permitted to be executed, played and/or recorded prior to acquisition of a key from key server 120 by either having this portion un-encrypted (i.e., in the clear), or encrypted using a key a client device already has access to. Portion 610 may correspond to a limited functionality, optionally in terms of time or program functionality, of computer program content. In the case of audio and/or video content, portion 610 may correspond to a portion of the overall program, such as a first few minutes. After some point 620, a portion 630 of the content is protected using a key to be acquired from key server 120 (e.g. encrypted).

Such a mechanism may present numerous advantages. Third party content distribution may be encouraged. Furthermore, content is identified before it is recorded. This prevents unauthorized execution, playing and/or recording of the content. Digital Rights Management (DRM) is integrated centrally at the key server(s). The key server(s) may track the permissible rights of each individual client device, or group of devices. If a particular device, or group of devices, has exceeded permissible execution, playing and/or recording rights, a key will not be issued to a requesting client device. Further, if customer billing information is provided, then DRM can be administered on a per customer basis (rather than on a device basis). Finally, content encryption can be segmented by any level of granularity. For example, each recorded piece of content could have a unique encryption key. To reduce latencies, a large number of keys may optionally be stored in the security architecture.

Figure 7:
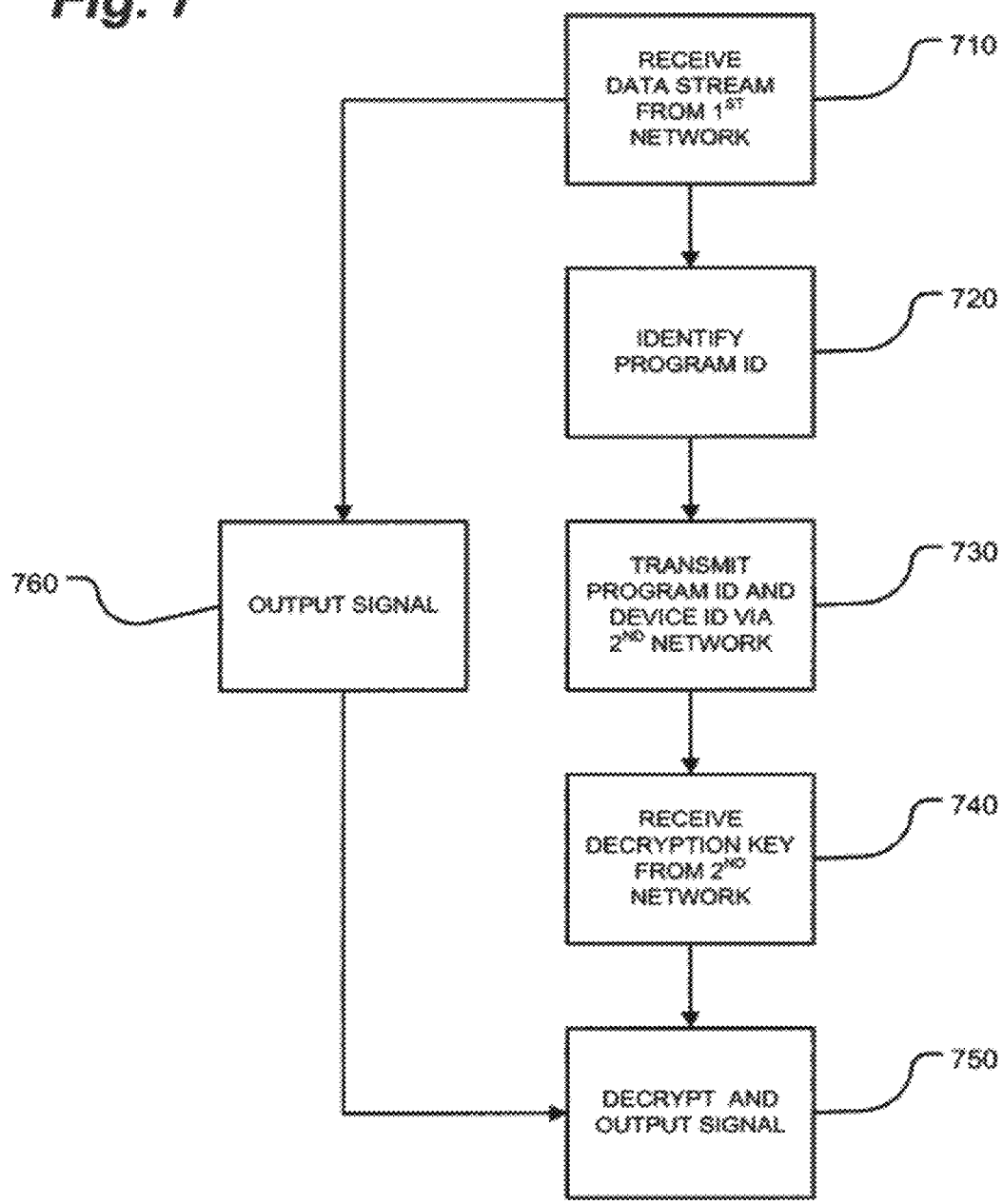

Referring now also to FIG. 7, there is shown a block diagrammatic representation of a method or process flow 700 according to an aspect of the present invention. Method 700 may be well suited for use with the system of FIG. 3 and process of FIG. 4. Analogous methodology may be used for recording content, or executing content, for example.

Method 700 includes receiving 710 a data stream indicative of a program via a first communications network. An identifier associated with the program is identified in block 720 from the received data stream. The program identifier is then transmitted (block 730) along with a device identifier associated with the accessing device, to an authorization device via a second communications network. A decryption key is received in block 740 via the second communications network, in response to transmission 730. The data stream may then be decrypted, and an output signal indicative of the decrypted data stream is output in block 750 using the received decryption key.

The received data stream may include a data portion representative of a first part of the program, and an encrypted data portion representative of a second part of the program. The first data portion may be generally accessible by the receiving device so as to be processed and used to output a signal (block 760) indicative of the first part of the program, independent of receipt of the decryption key for the second part of the program. In one exemplary embodiment, the data portion representative of the first part of the program is unencrypted. In an alternative exemplary embodiment, the data portion may be encrypted using a common key to which the receiver has access. The first data portion may thus be used to output a signal indicative of the first part of the program in block 760, such as prior to the decryption key being received in block 740. The steps of transmitting 730 and receiving 740 may be accomplished using a two-way pager network.

It is to be understood that the forms of this invention as shown are merely exemplary embodiments. Various changes may be made in the function and arrangement of parts; equivalent means may be substituted for those illustrated and described; and certain features may be used independently from others without departing from the spirit and scope of the invention as defined in the following claims.

What is claimed is:

1. A method of operating a digital program playback device, comprising:
receiving, via a first communications network, a plurality of data streams representative of a program including an encrypted data portion and an unencrypted data portion;
identifying, from the received data stream, an identifier uniquely associated with the program;
transmitting the program identifier and a device identifier that identifies the digital program playback device to an authorization device via a second communications network for authorization based on the program identifier and the device identifier,
wherein the second communications network is distinct from the first communications network;
receiving, via the second communications network, a decryption key in response to the transmission, once authorization is confirmed; and
decrypting the data stream using the decryption key and generating an output signal for playback of the program, wherein the unencrypted data portion is processed for output before the encrypted data portion.

2. The method of claim 1, wherein the unencrypted data stream representative of a beginning portion of the program, and an output signal in response to the unencrypted data stream is generated prior to said decryption key being received.

3. The method of claim 1, wherein the digital program playback device comprises a mobile user terminal, and the second communications network comprises a two-way pager network.

4. A method of transmitting a program for playback on a digital playback device, the method comprising the steps of:
generating a plurality of data streams representative of the program including an encrypted data portion and an unencrypted data portion to be processed for output before the encrypted data portion;
storing a decryption key for decrypting the encrypted data stream on a key server;
storing playback rights information associated with the digital playback device in a database;
transmitting, to the digital playback device, via a first communications network, the encrypted data stream;
receiving, via a second communications network, a request from the digital playback device to access the program, the request including an identifier uniquely associated with the program and an identifier that identifies the digital playback device, wherein the second communications network is distinct from the first communications network;
determining whether the digital playback device has access rights to the program according to the database based on the program identifier and a device identifier; and
transmitting the decryption key to the digital playback device in response to the determining step.

5. The method of claim 4, wherein the unencrypted data stream is representative of a beginning portion of the program.

6. The method of claim 4, wherein the digital playback device comprises a mobile user terminal, and the second communications network comprises a two-way pager network.

7. A method of operating a digital program recording device, the method comprising:
receiving, via a first communications network, a data stream including a first data portion representative of a first part of a program and an encrypted data portion representative of a second part of said program;
identifying, from the received data stream, an identifier uniquely associated with the program;
transmitting the program identifier and a device identifier that identifies the digital program recording device to an authorization device via a second communications network for authorization based on the program identifier and the device identifier, wherein the second communications network is distinct from the first communications network;
receiving, via the second communications network, a decryption key in response to the transmission once authorization is confirmed; and
decrypting the data stream using the decryption key and generating an output signal for recording the program wherein the first data portion is processed for output before the encrypted data portion.

8. The method of claim 7, wherein the first part of the program is a beginning portion of the program, and further comprising the step of generating an output signal in response to the first data portion prior to said decryption key being received.

9. The method of claim 7, wherein the first data portion is either unencrypted or encrypted using a common key.

10. The method of claim 7, wherein the second communications network comprises a two-way pager network.

11. A method of operating a computer program executing device, the method comprising:
   accessing, via a first communications network, a plurality of data streams representative of a program including a first data portion representative of a first part of said program and an encrypted data portion representative of a second part of said program;
   identifying, from the accessed data, an identifier uniquely associated with the program;
   transmitting the program identifier and a device identifier that identifies the computer program executing device to an authorization device via a second communications network for authorization based on the program identifier and the device identifier, wherein the second communications network is distinct from the first communications network;
   receiving, via the second communications network, a decryption key in response to the transmission once authorization is confirmed; and
   decrypting the encrypted data portion using the decryption key and generating an output for executing the program, wherein the first data portion is processed for output before the encrypted data portion.

12. The method of claim 11, wherein the first part of the program is a functionally limited version of said computer program, and further comprising the step of generating an output signal in response to the first part prior to said decryption key being received.

13. The method of claim 10, wherein the first data portion is either unencrypted or encrypted using a common key.

14. The method of claim 10, wherein the second communications network comprises a two-way pager network.

15. A computer program product stored on a non-transitory computer readable medium for use with a computing device and executing on a processor, the computer program product comprising:
   a first data portion representative of a first part of said computer program product, the first data portion received via a first communications network;
   an encrypted data portion representative of a second part of said computer program product, the encrypted portion received via a first communications network;
   code for identifying a program identifier uniquely associated with the computer program product from the first data portion, and a device identifier that identifies the computing device;
   code for transmitting the program identifier and device identifier to an authorization device via a second communications network for authorization based on the program identifier and the device identifier, wherein the second communications network is distinct from the first communications network;
   code for receiving a decryption key in response to the transmission; and
   code for decrypting the encrypted data portion of the computer program product using the decryption key and generating an output for executing the computer program product, wherein the first data portion is processed for output before generating the output based on the encrypted data portion.

16. The computer program product of claim 15, wherein said output for executing the computer program product comprises an output for activating a functionality of said computer program product corresponding to said second portion.

17. The computer program product of claim 16, wherein the first part of the computer program product is representative of a functionally limited version of said computer program product, and further comprising the step of generating an output signal in response to the first data portion prior to said decryption key being received.

18. The computer program product of claim 15, wherein the first data portion is either unencrypted or encrypted using a common key.

19. The computer program product of claim 15, wherein the second communications network comprises a two-way pager network.

20. A method for selectively providing a client device access to content, said method comprising:
   accessing a first data portion representative of a first part of said content and an encrypted data portion representative of a second part of said content, the first data portion and the encrypted data portion received via a first communications network;
   identifying, from the accessed data, an identifier uniquely associated with the content;
   transmitting the program identifier and a device identifier that identifies the client device to an authorization device via a second communication network for authorization based on the program identifier and the device identifier, wherein the second communications network is distinct from the first communications network;
   receiving a decryption key in response to the transmission;
   generating an output signal in response to the first data portion for accessing the first part of the content prior to said decryption key being received; and
   decrypting the encrypted portion of the data using the decryption key and generating an output signal in response to the decrypted portion for accessing the second part of the content, wherein the first part of the content is processed for output before the encrypted portion.

21. The method of claim 20, wherein said content comprises at least one of a computer program product, an audio presentation and an audio/visual presentation.

22. The method of claim 20, wherein said providing access comprises at least one of executing a computer program product, playing an audio presentation, playing an audio/visual presentation, recording an audio presentation and recording an audio/visual presentation.

23. The method of claim 20, wherein said transmitting and receiving is via a two-way pager network.

24. The method of claim 20, wherein the first data portion is either unencrypted or encrypted using a common key.

* * * * *